United States Patent
Maurya et al.

(10) Patent No.: US 11,816,612 B1
(45) Date of Patent: Nov. 14, 2023

(54) PREDICTING TRUE DEMAND OF NETWORK SERVICES WITH USAGE CONSTRAINTS

(71) Applicant: Amazon Technologies, Inc., Seattle, WA (US)

(72) Inventors: Abhinav Maurya, Seattle, WA (US); Andrew C. Becker, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 755 days.

(21) Appl. No.: 16/822,251

(22) Filed: Mar. 18, 2020

(51) Int. Cl.
  *G06Q 30/00* (2023.01)
  *G06N 5/04* (2023.01)
  *G06Q 10/0631* (2023.01)
  *G06Q 30/0204* (2023.01)
  *H04L 67/306* (2022.01)
  *H04L 9/40* (2022.01)
  *H04L 41/147* (2022.01)
  *G06Q 10/0635* (2023.01)

(52) U.S. Cl.
  CPC .......... *G06Q 10/06315* (2013.01); *G06N 5/04* (2013.01); *G06Q 10/0635* (2013.01); *G06Q 30/0204* (2013.01); *H04L 41/147* (2013.01); *H04L 63/102* (2013.01); *H04L 67/306* (2013.01)

(58) Field of Classification Search
  CPC .............. G06Q 10/06315; G06N 5/04; G06Q 10/0635; G06Q 30/0204; H04L 41/147; H04L 63/102; H04L 67/306
  See application file for complete search history.

(56) References Cited

U.S. PATENT DOCUMENTS

| | | | | |
|---|---|---|---|---|
| 2006/0218278 | A1* | 9/2006 | Uyama et al. | G06Q 10/04 709/226 |
| 2014/0058572 | A1* | 2/2014 | Stein et al. | G06Q 50/06 700/291 |
| 2014/0317283 | A1* | 10/2014 | Brown et al. | G06F 9/5072 709/224 |

FOREIGN PATENT DOCUMENTS

WO 2008121207 A1* 10/2008 ............... H04L 67/18

OTHER PUBLICATIONS

Squillante et al., Profile-based traffic characterization of commercial web sites, https://www.cse.iitb.ac.in/~varsha/allpapers/cloud/trafficCharWebServITC2003.PDF, Teletraffic Science and Engineering., 2003 (Year: 2003).*

* cited by examiner

*Primary Examiner* — Crystol Stewart
*Assistant Examiner* — Uche Byrd
(74) *Attorney, Agent, or Firm* — Thomas Horstemeyer, LLP

(57) ABSTRACT

Various embodiments are disclosed for predicting true demand of network services that impose usage constraints. A computing environment may be configured to provide a network service for a user account, where a usage constraint for the network service is imposed on the user account. A truncated usage distribution of the network service may be generated based on usage history data. A demand curve of the network service may be generated for the user account, where the demand curve comprises at least a portion of the truncated usage distribution and a predicted usage of the at least one network service beyond the usage constraint. One or more actions may be performed based on the demand curve, such as increasing the usage constraint.

20 Claims, 7 Drawing Sheets

PREDICTING TRUE DEMAND OF NETWORK SERVICES WITH USAGE CONSTRAINTS

BACKGROUND

Various organizations offer network services, also referred to as "web services," that are utilized by various computing applications when performing enterprise-related tasks. These network services may include data storage, video streaming, machine learning, "serverless" computing, and other network services offered using physical and virtual computing resources of one or more data centers. Network services are often protected from unlimited or interrupting use by placing constraints on usage of individual customers. For instance, a number of network calls to a particular network service may be limited within a certain period of time. With constraints on a network service in place, an administrator is able to only determine a truncated demand for the network service from a perceived usage capped by a constraint. True demand for the network service by individual customers is unable to be determined as if customers were allowed to freely use the network service without any upper limit on their service usage.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
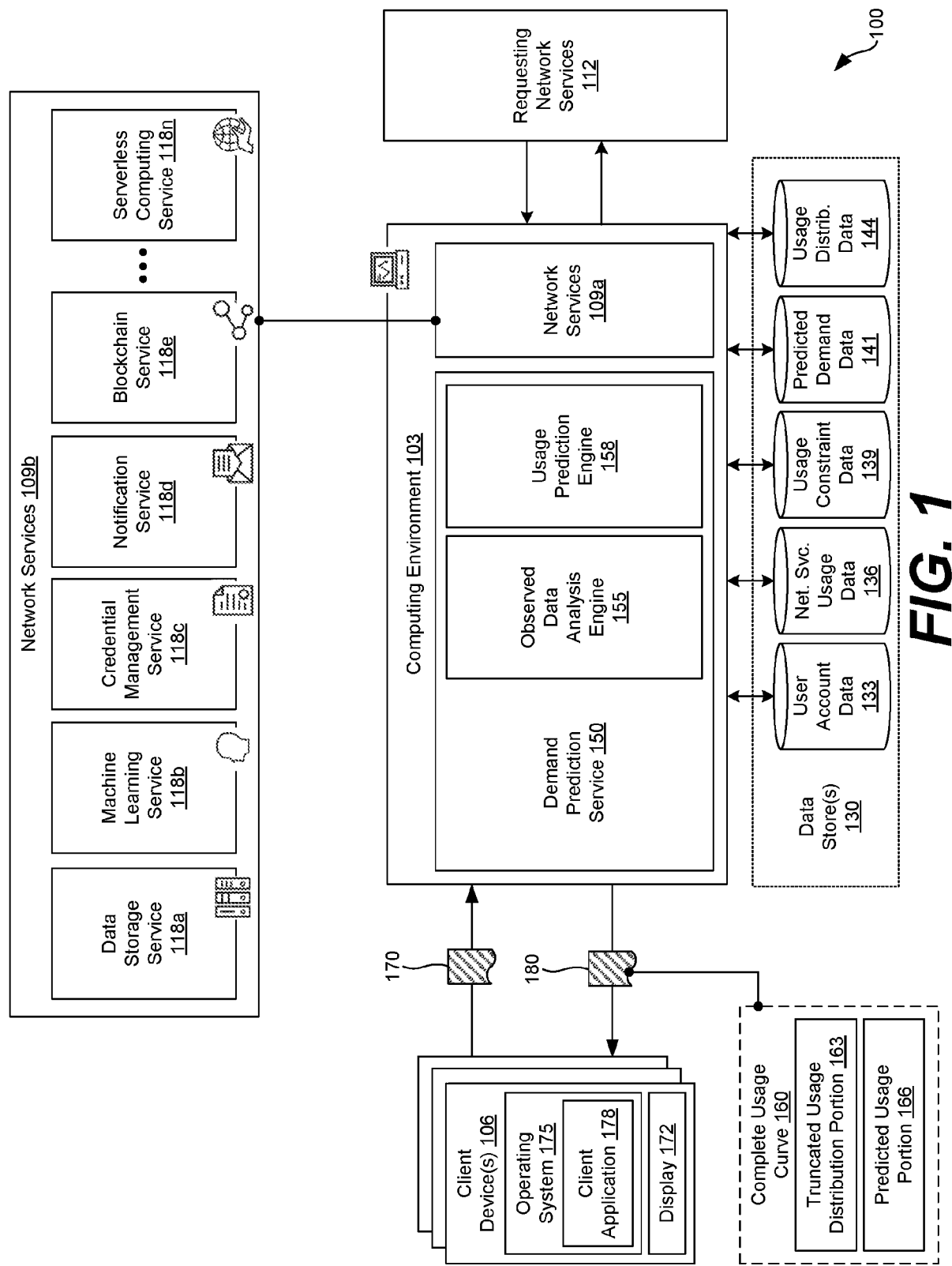
FIG. 1 is a drawing of a networked environment according to various embodiments of the present disclosure.

The present disclosure relates to predicting true demand of cloud computing services that impose usage constraints on users, thereby obfuscating the actual amount of usage that would occur if the usage constraints / limits were not in place. A cloud computing provider may offer web services and other network services that are utilized by individuals, applications, services, etc. when performing computing-related tasks. For instance, network services may include virtualized compute resources, data storage, video streaming, machine learning, "serverless" computing, and other network services. However, if consumers were permitted to access such network services without any usage constraint, a number of requests for storage, processing, or retrieval of data may inundate computing resources and impair the operability of the network service. As such, many cloud computing providers impose usage constraints. For instance, a number of network calls to a particular network service may be limited within a certain period of time, or each user of a virtualized compute service may have their own limit on the number of compute instances that they can launch within a certain period of time.

With constraints on a network service in place, administrators are only able to determine a truncated demand for the network service due to usage constraints. In other words, it is not possible to determine the true demand for the network service by individual customers as if the customers were allowed to freely use the network service without having any limit on the use of the network service. Usage forecasts that are used to scale up services and/or provision new infrastructure, therefore, are based on truncated demand rather than actual demand. However, the service provider may desire to scale the service to actual demand (or as close to actual demand as possible) in order to satisfy the customer demand for the service. Accordingly, various embodiments are disclosed for predicting true demand of network services that impose usage constraints.

According to one example, a computing environment may be configured to provide a network service for a user account, wherein a usage constraint is imposed on the user account for the network service. A truncated usage distribution of the network service may be generated based on usage history data. A demand curve of the network service may be generated for the user account, where the demand curve comprises at least a portion of the truncated usage distribution and a predicted usage for the at least one network service that may have occurred, for instance, if the usage constraint had not been in place at the time the usage occurred. Accordingly, "predicted usage" as used herein refers not to a future predicted usage, but rather to a predicted past usage that could have occurred but for the limits imposed on the user. One or more actions may be performed based on the demand curve, such as requesting to increase the usage constraint.

In the following discussion, a general description of a computing environment for predicting true demand of network services with usage constraints and its components is provided, followed by a discussion of the operation of the same.

With reference to FIG. 1, a networked environment 100 is shown according to various embodiments. The networked environment 100 includes a computing environment 103 and a client device 106, which are in data communication with each other via a network. The network includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks. The computing environment 103 may provide computing or network services 109 (herein "network services 109") that may respond to network calls sent by requesting network services 112 over the network as will be described.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

In some implementations of the disclosed technology, the computing environment 103 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services (e.g., network services 109), which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The network services 109 may include web services in some examples that can be invoked using a network service call made to an application programming interface (API). An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The network services 109 may be implemented in the computing environment 103 and/or operated by a common computing provider. However, in other embodiments, the network services 109 may be independent of (and separate from) the computing environment 103 and may be operated by a third-party computing provider.

In various embodiments, the network services 109 may include those that store, process, generate, and/or retrieve data. To this end, in various embodiments, the network services 109 may include an elastic compute cloud service (also referred to as a virtual computing service, an elastic compute service, a virtual machine service, a computing cloud service, a compute engine, or a cloud compute service, in various implementations), a data storage service 118*a*, a machine learning (ML) service 118*b*, a credential management service 118*c*, a notification service 118*d*, a blockchain service 118*e*, a serverless computing service 118*n* (also referred to as a function compute service, functions service, cloud functions service, or functions as a service, in various implementations), video streaming services, as well as other types of network services 109 as can be appreciated. In some embodiments, the data storage service 118 may be an elastic block store service (also referred to as a cloud disks service, managed disk service, storage area network service, persistent disk service, or block volumes, in various implementations) that supports customer volumes.

Various applications and/or other functionality may be executed in the computing environment 103 according to various embodiments. Also, various data is stored in a data store 130 that is accessible to the computing environment 103. The data store 130 may be representative of a plurality of data stores 130 as can be appreciated. The data stored in the data store 130, for example, is associated with the operation of the various applications and/or functional entities described below.

The data stored in the data store 130 may include user account data 133, network service usage data 136, usage constraint data 139, predicted demand data 141, usage distribution data 144, as well as other data. User account data 133 may include information pertaining to one or more user accounts required to access one or more of the network services 109. To this end, user account data 133 may include credentials to access a network service 109, such as digital certificates, cryptographic keys, usernames, passwords, personal identification numbers (PIN), and other data.

Network service usage data 136 may include history data pertaining to use of the network services 109. For instance, each time a network service 109 is called or queried, data relating to the corresponding network call or query may be stored as network service usage data 136. As such, one or more historical events may be queried to determine whether a network service 109 has been called or otherwise accessed in compliance with or beyond a usage constraint, such as a number of queries permitted in a day or other period of time. The network service usage data 136 may be stored in association with one or more user accounts. Usage constraint data 139 may include usage constraints for one or more user accounts.

In some examples, usage constraints may include a permitted number of queries for a given period of time, an amount of computing resources permitted to be used within a period of time, a maximum number of virtual or elastic computing instances or virtual machines permitted in a given period of time, a number of responses permitted for a given period of time, a number of transactions permitted for a given period of time, and so forth. Predicted demand data 141 may include predicted usage of the network services 109 as if a usage constraint had not existed at a time the usage occurred, and potentially other predicted usage data. Accordingly, in some embodiments, the predicted usage may be referred to as a predicted unconstrained usage. Usage distribution data 144 may include usage distributions, as will be described.

The components executed on the computing environment 103, for example, include a demand prediction service 150. The demand prediction service 150 is executed to predict demand of one or more of the network services 109 based on network service usage data 136, which may include historical use of the one or more network services 109. As such, in some embodiments, the demand prediction service 150 may include an observed data analysis engine 155, a usage prediction engine 158, and other applications, services, processes, systems, engines, or functionality not discussed in detail herein. In various embodiments, a predicted usage of a network service 109 may be determined for one or more user accounts.

The observed data analysis engine 155 is executed to analyze historical data usage, for instance, to generate a truncated observed distribution. In various embodiments, a truncated observed distribution may include a plot of historical use of a network service 109 over time. However, the distribution is "truncated" as no data beyond a usage limit is observed. As the usage is truncated, an administrator, such as a user of the network service 109 or information technology (IT) personnel overseeing operation of the network service 109, may only determine a truncated demand for the service from perceived usage capped by the usage constraint. In other words, administrators are unable to determine an accurate demand for a network service 109 if a user account were permitted to freely use the service without any upper limit on their service usage.

Accordingly, in some embodiments, the demand prediction service 150 may generate a complete usage curve 160 describing an actual or true demand of a user account for a network service 109. The complete usage curve 160 may include, for example, a truncated usage distribution portion 163 and a predicted usage portion 166, where the predicted usage portion 166 is generated by the usage prediction engine 158. The predicted usage portion 166 may also be referred to as an extrapolated usage portion or an untruncated observed distribution portion, as may be appreciated.

In some embodiments, a complete usage curve 160 may be generated by fitting an approximating curve to the truncated usage distribution portion 163 and then extrapolating the distribution beyond a usage constraint to generate a complete usage curve 160. In conventional forecasting of a data value at a time t, a conventional routine may accept time t and a value x as inputs (t, x), thereby generating a data value expected at time t. However, in accordance with various embodiments herein, the usage prediction engine 158, rather, may take time t and value x as inputs to determine a probability p of a usage data point occurring in historical usage data. In other words, in some embodiments, the usage prediction engine 158 does not predict a future usage value at a given point in time; instead, the usage prediction engine 158 analyzes historical usage distributions and extrapolates the historical usage distribution as if a usage constraint was not in place at the time the usage occurred.

In various embodiments, the approximating curve may be performed statistically, for instance, using a linear regression estimation routine, a truncated Poisson distribution routine (parametric or non-parametric), a zero-truncated Poisson (ZTP) distribution routine, a truncated Gaussian routine, a mixture of truncated Gaussians routine, a mixture of truncated Poisson routine, a cubic spline routine, or any combination thereof, or other approximation technique. In place of or in addition to the foregoing, the approximating curve may be determined using a curve-fitting routine traditionally used in computer graphics, such as a Bezier curve-fitting routine. Bezier curve-fitting routines tend to work well when an observed truncated distribution is smooth and can be extrapolated easily to generate an non-truncated portion, as will be described.

In various embodiments, the truncated usage distribution portion 163 and/or the predicted usage portion 166 may be generated using data points of arbitrary dimensions describing usage at a particular point in time. However, in some embodiments, to generate the truncated usage distribution portion 163 or the predicted usage portion 166 more quickly and with less computing resources, a percentage and/or a data point having a fixed dimension can be used in place of a data point as a percentage is a less processor-intensive value as opposed to a floating point or a data point of an arbitrary number of dimensions.

More specifically, computational efficiency can be gained using quantiles. For instance, when empirical distributions are high-dimensional (e.g., when there are a large number of records of an account's historical usage), the computing environment 103 may sample uniformly-spaced quantiles to reduce the number of records input to a true demand prediction module. As a non-limiting example, if a minute amount of usage data of an account is observed over a year, we may have around 0.53 million records of observed historical usage of the account. Often, making a true demand prediction with such a high number of records per account can be prohibitive for services that have a large number of accounts and/or users. However, if the computing environment 103 samples quantiles of observed usage from 0 to 100 in steps of 0.01, or other suitable steps, we would obtain around 10,000 recorded quantiles. This summarization and compression of all records into only the quantiles can significantly speed up true demand prediction, particularly with more complex distribution approximations, such as mixtures of truncated Poisson routines and/or Gaussian routines.

The client device 106 is representative of a plurality of client devices that may be coupled to the network. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 172. The display 172 may comprise, for example, one or more devices such as liquid crystal display (LCD) displays, gas plasma-based flat panel displays, organic light emitting diode (OLED) displays, electrophoretic ink (E-ink) displays, LCD projectors, or other types of display devices, etc.

The client device 106 may include an operating system 175 configured to execute various applications, such as a client application 178, and/or other applications. The client application 178 may be executed in a client device 106, for example, to access network content served up by the computing environment 103 and/or other servers, thereby rendering a user interface on the display 172. To this end, the client application 178 may comprise, for example, a browser, a dedicated application, etc., and a user interface may comprise a network page, an application screen, etc. The client device 106 may be configured to execute applications beyond the client application 178 such as, for example, email applications, social networking applications, word processors, spreadsheets, and/or other applications.

Next, a general description of the operation of the various components of the networked environment 100 is provided. To begin, it is understood that an administrator of a network service 109 or an administrator for a user account that utilizes a network service 109 may desire to determine whether a usage constraint will impact performance of a network service 109. Assume, for instance, an administrator for an enterprise creates a user account to utilize the data storage service 118a. The data storage service 118a may be called by a requesting network service 112 to store or retrieve enterprise data over the network. The administrators overseeing the data storage service 118a may impose a usage constraint on individual user accounts such that one or more user accounts do not inundate the data storage service 118a with storage or retrieval requests, which would impair operation of the data storage service 118a for other user accounts and other requesting network services 112.

In the example of a data storage service 118a, a usage constraint may include a permitted number of storage or retrieval requests called within a predefined period of time. For instance, a usage constraint may include one-thousand storage requests and one-thousand retrieval requests permitted in a day. As usage constraints are imposed, if a user account exceeds the usage constraint, no storage or retrieval operations are permitted and a requesting network service 112 may become non-operational, which is undesirable. However, most network services 109 are required to impose usage constraints to protect an overwhelming amount of computing resources being used by particular user accounts.

As such, administrators may desire to periodically view demand for a network service 109 such that the administrators may purchase or otherwise obtain a higher or lower usage constraint. However, with usage constraints in place, administrators are only able to determine a truncated demand for a network service 109 from the perceived usage capped by the usage constraint. In other words, administrators will not be able to determine what an actual demand would be if a user account were allowed to freely use the network service 109 without a usage constraint imposed on their use of the network service 109.

In various embodiments, the demand prediction service 150 may predict actual or true demand of one or more network services 109 having usage constraints imposed on user accounts utilizing the network services 109. The demand prediction service 150 may receive a request 170 from a client device 10 for a complete usage curve 160. The complete usage curve 160 may include a truncated usage distribution portion 163 that is based on usage history for a user account, where the usage history is obtained from the network service usage data 136. The complete usage curve 160 may further include a predicted usage portion 166 that is estimated based at least in part on the truncated usage distribution portion 163 and/or usage history observed from other user accounts.

To generate the complete usage curve 160, the observed data analysis engine 155 may first generate the truncated usage distribution portion 163, which can include usage of a network service 109 observed over time. For instance, based on usage data points (e.g., a number of requests at a given time t), the usage prediction engine 158 may predict usage as if a usage constraint had not been in place based on past usage. In some embodiments, the demand prediction service 150 may generate a complete usage curve 160 by fitting an approximating curve to the truncated usage distribution portion 163 and, thereafter, extrapolating the distribution beyond a usage constraint to generate a complete usage curve 160.

In various embodiments, the approximating curve may be performed statistically, for instance, using a truncated Poisson distribution routine, a zero-truncated Poisson distribution routine, a truncated Gaussian routine, a mixture of truncated Gaussians routines, a mixture of truncated Poisson routines, a cubic spline routine, or any combination thereof, or other approximation technique. In place of or in addition to the foregoing, the approximating curve may be determined using a curve-fitting routine traditionally used in computer graphics, such as a Bezier curve-fitting routine.

The complete usage curve 160, or data associated therewith, may be sent to the client device 106 as a result 180, or may be sent to a requesting network service 112. The complete usage curve 160 may be consulted by the demand prediction service 150 (or other service) to perform one or more actions. For instance, an action may include sending the complete usage curve 160 to an administrator of the user account. An administrator of the user account may be able to manually adjust a usage constraint associated with the user account, for instance, by purchasing a higher or lower usage constraint. Alternatively, in some embodiments, the computing environment 103 may take an automated action, such as automatically adjusting the usage constraint associated with the user account and charging the user account based on the adjustment. In other embodiments, the computing environment 103 may take an automated action, such as creating a ticket instructing an administrator to adjust (e.g., increase) a constraint on use of a network service 109.

In some situations, extrapolation based on an observed truncated usage distribution may not be accurate. For example, an evaluation of certain truncated usage distributions may make unclear whether usage is increasing, decreasing, or plateauing. As such, in some situations, when a reliability of a predicted usage does not satisfy a reliability threshold, other user accounts may be analyzed to predict usage. To this end, in some embodiments, the demand prediction service 150 may identify user accounts having a usage similar to the truncated usage distribution portion 163 for a first account (e.g., Account X) and predict usage based on an analysis of those user accounts (e.g., Account A, Account B, Account C, and so forth). Accordingly, the demand prediction service 150 may compare the truncated usage distribution portion 163 for Account X to other usage distributions for other user accounts.

If the usage distributions for Account A, Account B, and Account C show decreases in usage over time, similarly, the predicted usage portion 166 may be generated to show a decrease in usage. Conversely, if the usage distributions for Account A, Account B, and Account C show increases in usage over time, the predicted usage portion 166 may be generated to show an increase in usage. If the usage distributions for Account A, Account B, and Account C show plateaus in usage over time, the predicted usage portion 166 may be generated to also show a plateau in usage of the network service 109. In some embodiments, the predicted usage portion 166 is generated based on an averaging of the usage occurring beyond a usage limit or other constraint. For instance, usage for three user accounts (e.g., Account A, Account B, and Account C) may be averaged to generate the predicted usage.

In some embodiments, the predicted usage may be generated using a weighted average of usage occurring in the user accounts (e.g., usage of Account A, usage of Account B, and so forth), where the weighted average is equal to $$\frac{\sum wx}{\sum w},$$

where w is a weight assigned to a user account and x is a usage value. For instance, a first weight $W_{xa}$ may be generated for usage occurring beyond a usage constraint for User Account A based on a distance between the truncated usage distribution portion 163 of Account X, a second weight $W_{xb}$ may be generated for User Account B based on a distance between the truncated usage distribution portion 163 of Account B, a third weight $W_{xc}$ may be generated for User Account C based on a distance between the truncated usage distribution portion 163 of Account X, and so forth. In other words, the weighted average is based on an inverse of a distance between usage of a respective user account and usage of Account X. To this end, curves more similar to the untruncated distribution portion 163 of Account X while be assigned more weight as opposed to curves less similar.

In some embodiments, a distance between an untruncated usage distribution portion 163 of Account X and a usage occurring beyond a usage constraint is determined using a Kullback-Leibler (KL) divergence routine, a Hellinger distance routine, a Jensen-Shannon divergence routine, or other suitable routine.

Accordingly, the predicted usage portion 166 of the complete usage curve 160 may be generated by identifying a first portion of a usage distribution for other ones of the user accounts that is similar to the truncated usage distribution portion 163 generated for a user account (e.g., Account X). Thereafter, the demand prediction service 150 may determine the predicted usage portion 166 for Account X based on a second portion of the usage distribution for Account A, Account B, Account C, and so forth.

Figure 2A:
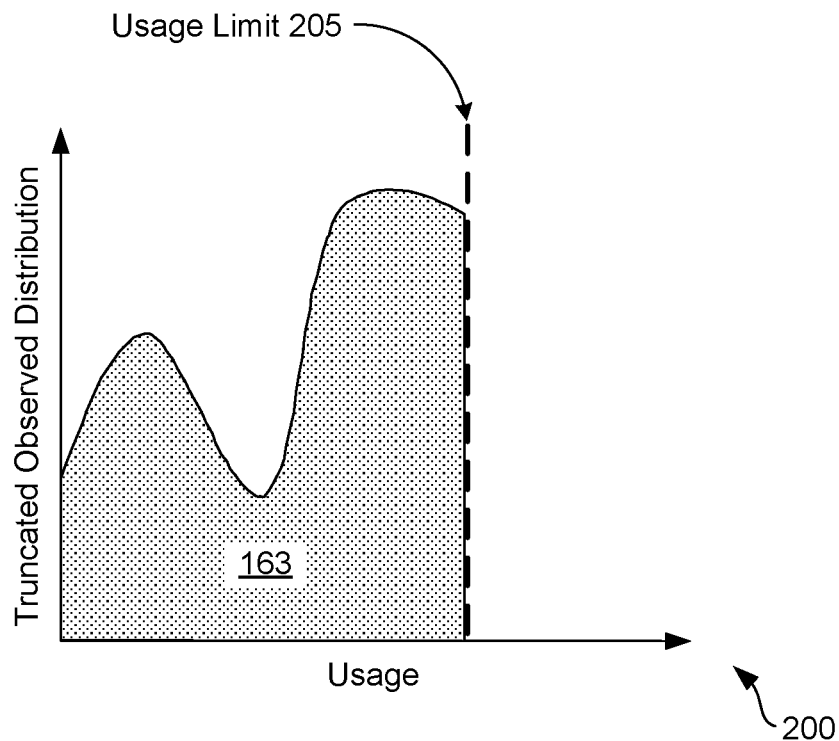
FIG. 2A is a graph showing a truncated usage distribution according to various embodiments of the present disclosure.

Turning now to FIG. 2A, a graph is shown illustrating a truncated usage distribution 200 according to various embodiments of the present disclosure. The truncated usage distribution 200 may include a truncated usage distribution portion 163, which is shown as the shaded region of the graph in FIG. 2A. The usage distribution is "truncated," as usage of the network service 109 has reached a usage limit 205. In other words, no further use of the network service 109 occurs as further use is denied or otherwise restricted. Notably, an administrator viewing the truncated usage distribution 200 may be unable to ascertain whether usage will increase or decrease beyond the usage limit 205 if a usage limit 205 were not in place. Accordingly, an administrator may be uncertain whether to allocate a higher usage limit 205 or otherwise adjust use of the network service 109.

Figure 2B:
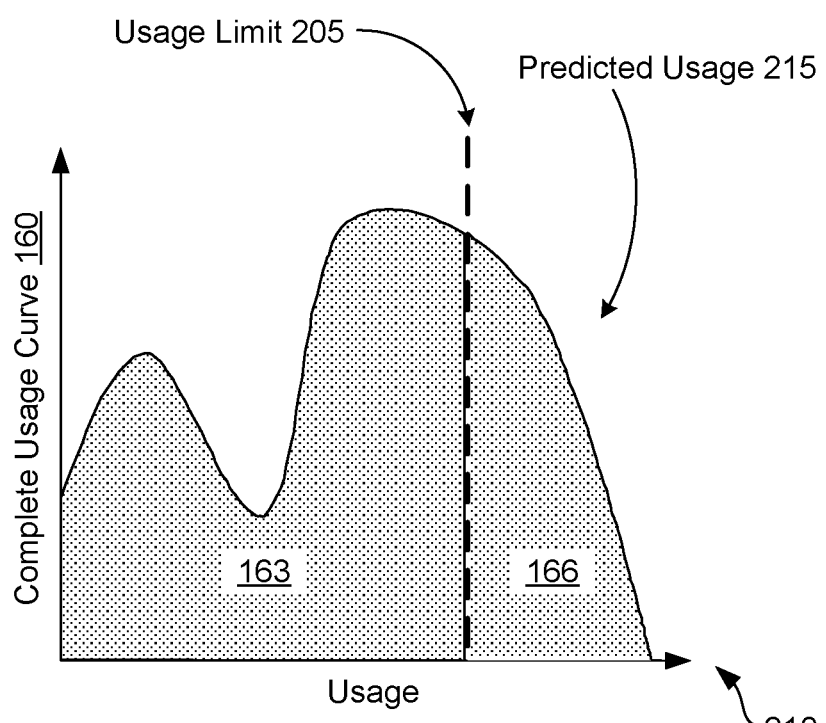
FIG. 2B is a graph showing a complete usage curve having a truncated usage distribution portion and a predicted usage portion according to various embodiments of the present disclosure.

Moving along to FIG. 2B, a graph 210 is shown illustrating a non-truncated usage distribution or, in other words, a complete usage curve 160 having a truncated usage distribution portion 163 and a predicted usage portion 166 according to various embodiments of the present disclosure. Notably, the truncated usage distribution portion 163 is generated using actual usage derived from network service usage data 136. As a usage limit 205 is imposed it is difficult to determine whether a usage limit 205 should be increased or decreased based on a trajectory of the truncated usage distribution portion 163.

As such, the predicted usage portion 166, showing predicted usage 215, is generated using the truncated usage distribution portion 163, as well as other data as will be described. In various embodiments, the demand prediction service 150 may generate the predicted usage portion 166 by fitting an approximating curve to the truncated usage distribution portion 163 and, thereafter, extrapolating the distribution beyond the usage limit 205 and thereby generating the complete usage curve 160.

Figure 3:
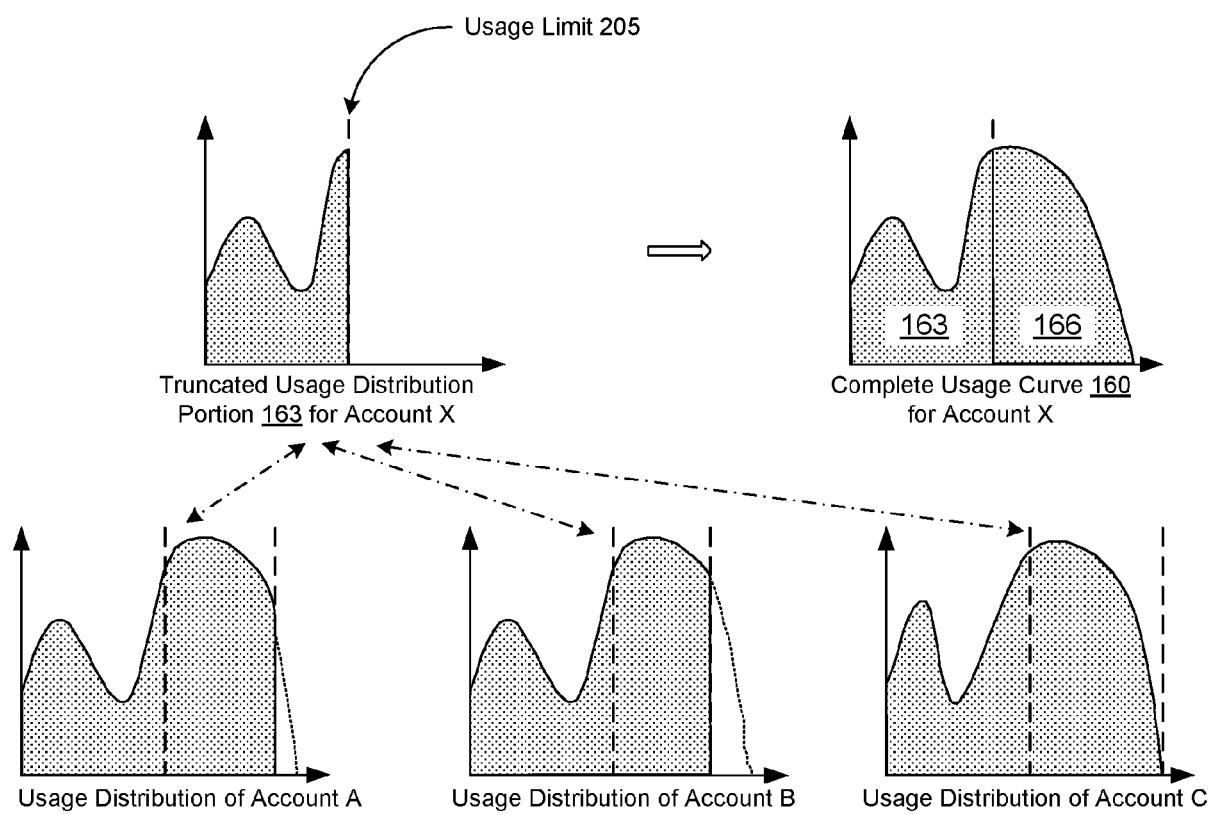
FIG. 3 is a schematic diagram showing a transition from a truncated usage distribution to a complete usage curve according to various embodiments of the present disclosure.

Referring next to FIG. 3, a schematic diagram is shown that illustrates a transition from a truncated usage distribution for an example account (e.g., "Account X") to a complete usage curve 160 according to various embodiments of the present disclosure. In some situations, extrapolation based on an observed truncated usage distribution may not be accurate or reliable. Consider, for example, the truncated usage distribution portion 163 shown in FIG. 3. It is not clear what the extrapolated demand for Account X (e.g., a user account) should be beyond the usage limit. For instance, usage may be increasing, decreasing, or plateauing.

In order to predict demand in such cases, in some embodiments, the demand prediction service 150 may identify user accounts having a usage similar to the truncated usage distribution portion 163 of Account X and predict usage based on an analysis of those user accounts. Accordingly, the demand prediction service 150 may compare the truncated usage distribution portion 163 for Account X to other usage distributions for other user accounts (e.g., Account A, Account B, and Account C). The usage distributions for Account A, Account B, and Account C all show decreases in usage over time.

As such, the predicted usage portion 166 of the complete usage curve 160 may be generated to show decreasing usage. To this end, the predicted usage portion 166 of the complete usage curve 160 may be generated by identifying a first portion of a usage distribution for other ones of the user accounts that is similar to the truncated usage distribution portion 163 generated for a user account (e.g., Account X). Thereafter, the demand prediction service 150 may determine the predicted usage portion 166 for Account X based on a second portion of the usage distribution for Account A, Account B, Account C, and so forth. While three user accounts are shown in FIG. 3, it is understood that the demand prediction service 150 may analyze one or more other user accounts in predicting demand.

Figure 4:
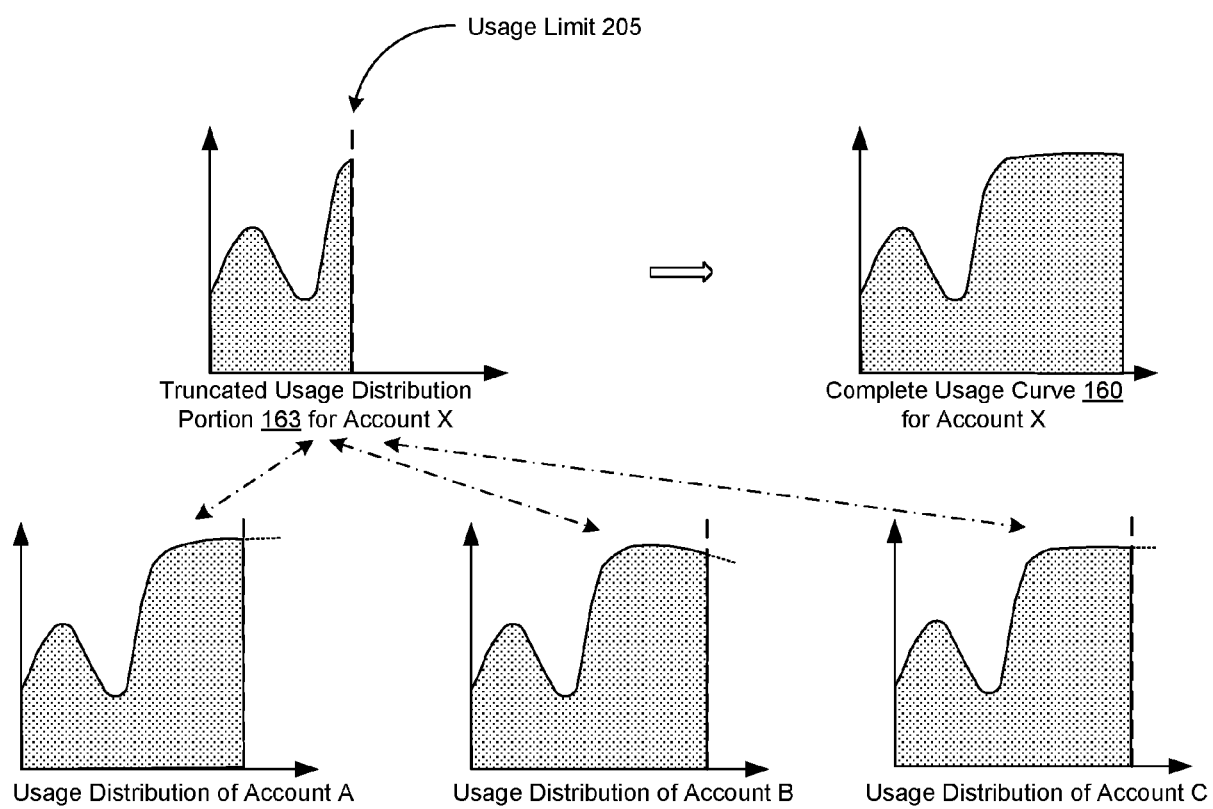
FIG. 4 is another schematic diagram showing a transition from a truncated usage distribution to a complete usage curve according to various embodiments of the present disclosure.

Turning next to FIG. 4, another schematic diagram is shown that illustrates a transition from a truncated usage distribution for an example account (e.g., "Account X") to a complete usage curve 160 according to various embodiments of the present disclosure. Like the situation described in FIG. 3, extrapolation based on an observed truncated usage distribution may not be accurate or reliable. For example, the truncated usage distribution portion 163 shown in FIG. 4 makes it unclear whether an extrapolated demand for Account X (e.g., a user account) should be increasing, decreasing, or plateauing beyond the usage limit 205 or other usage constraint.

As such, the demand prediction service 150 may compare the truncated usage distribution portion 163 for Account X to other usage distributions for other user accounts (e.g., Account A, Account B, and Account C). The usage distributions for Account A, Account B, and Account C all show where usage is plateauing, or staying constant, over time. Accordingly, the predicted usage portion 166 of the complete usage curve 160 may be generated to show a plateau in usage.

Figure 5:
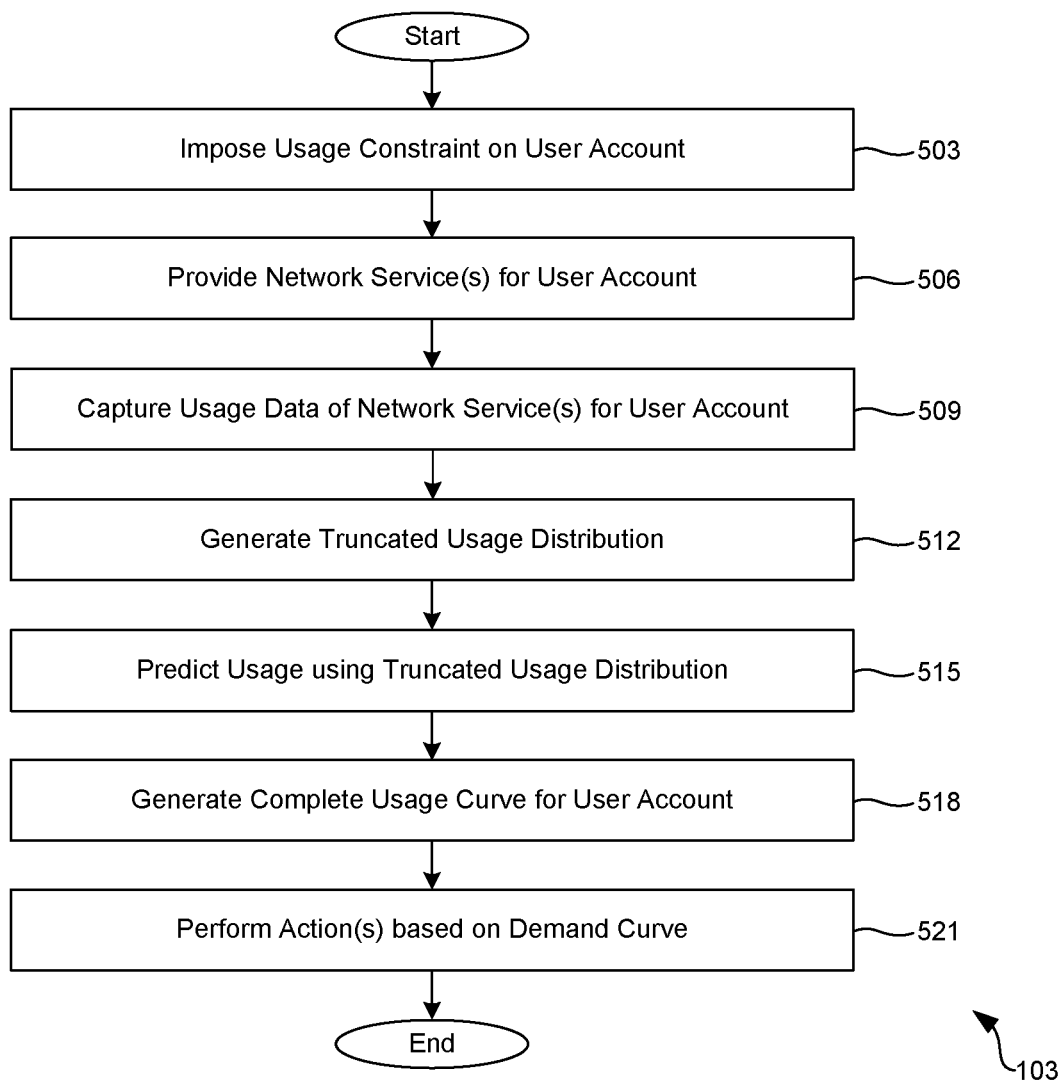
FIGS. 5 and 6 are flowcharts illustrating functionality executed in a computing environment of the networked environment of FIG. 1 according to various embodiments of the present disclosure.

Moving on to FIG. 5, a flowchart is shown that provides one example of the operation of a portion of the demand prediction service 150 according to various embodiments. It is understood that the flowchart of FIG. 5 provides merely an example of the many different types of functional arrangements that may be employed to implement the operation of the portion of the demand prediction service 150 as described herein. As an alternative, the flowchart of FIG. 5 may be viewed as depicting an example of elements of a method implemented in the computing environment 103 according to one or more embodiments.

Beginning with 503, the computing environment 103 may impose a usage constraint on one or more of the user accounts such that the user accounts are not provided with unlimited access to the network services 109. For instance, administrators of the computing environment 103 and/or network services 109 may impose a usage constraint on individual user accounts such that one or more user accounts do not inundate the notification service 118d with requests, which would impair operation of the notification services 118 for other user accounts and other requesting network services 112.

In the example of the notification service 118d, a usage constraint may include a permitted number of requests to send a notification received by the notification service 118d within a predefined period of time. Alternatively, a usage constraint may include a number of messages sent by the notification service 118d. For instance, the usage constraint may include ten-thousand push notifications permitted in a day or other period of time. As usage constraints are imposed, if a user account exceeds the usage constraint, no notification are sent and various requesting network services 112 may become non-operational. Due to demand for network services 109, most network services 109 impose usage constraints to protect an overwhelming amount of computing resources being used by particular user accounts.

Next, in 506, the computing environment 103 may provide one or more network services 109. The network services 109 may be accessed programmatically over a network using one or more programmatic network calls. In some embodiments, the network services 109 are provided in associated with a user account. For instance, user account credentials are used to authenticate programmatic network calls to the network services 109 and, if authenticated, the network services 109 may be used to retrieve, store, or process data.

Administrators that oversee or monitor network services 109 may analyze usage of one or more of the network services 109 to see whether current or future usage will impact performance of a network service 109. For example, an administrator for an enterprise may create a user account to utilize the notification service 118d. The notification service 118d may be called by a requesting network service 112 to schedule transmission of notification via push notification, email, simple messaging service (SMS), etc.

In 509, the computing environment 103 may capture usage data describing usage of one or more of the network services 109 by a given user account. The usage data may be stored in memory as user account data 133.

In 512, the computing environment 103 may generate a truncated usage distribution using, for instance, the usage data capture in 509. The computing environment 103 may generate the truncated usage distribution using usage data points observed over time. For instance, the usage data points may include a number of queries received within a predetermined time window (e.g., ten minutes, one hour, one day, and so forth).

To avoid instances where a requesting network service 112 becomes non-operational, administrators may desire to periodically view demand for a network service 109 such that the administrators may purchase or otherwise obtain a higher or lower usage constraint depending on current or future use. However, with usage constraints in place, administrators are only able to determine a truncated demand for a network service 109 from the perceived usage capped by the usage limit 205 or other constraint. In other words, administrators will not be able to determine what an actual demand would be if a user account were allowed to freely use the network service 109 without a usage constraint imposed on their use of the network service 109.

In some embodiments, the computing environment 103 can reduce a number of usage records, or usage data points, prior to generating the truncated usage distribution portion 163 in 512, or prior to generating a complete usage curve 160 in 518. For instance, in an instance in which a number of records of a user account's historical usage exceeds a predetermined threshold (e.g., half a million or greater or other suitable threshold), the computing environment 103 may sample uniformly-spaced quantiles to reduce the number of records input to a true demand prediction module. For example, even if a minute amount of usage data of an account were observed over a year, it is possible to have around 0.53 million records of observed historical usage of the account, which can be processor intensive when analyzing and performing calculating in the computing environment 103. Often, making a true demand prediction with such a high number of records per account can be prohibitive for services that have a large number of accounts and/or users. However, in various embodiments, the computing environment 103 may sample quantiles of observed usage from 0 to 100 in steps of 0.01, or other suitable metric, to reduce the 0.53 million usage data points to obtain around 10,000 recorded quantiles. This summarization and compression of all records into only the quantiles can significantly speed up true demand prediction, particularly with more complex distribution approximations, such as mixtures of truncated Poisson routines and/or Gaussian routines.

Accordingly, in 515, the computing environment 103 may predict usage for the user account, for instance, using the truncated usage distribution and/or other data as if a usage constraint had not been in place. For instance, the usage prediction engine 158 may predict usage based on past usage of a network service 109 by a user account. As such, the computing environment 103 may predict actual demand for one or more network services 109 having usage constraints imposed on user accounts utilizing the network services 109.

Next, in 518, the computing environment 103 may generate a complete usage curve 160 for a user account. In some embodiments, the computing environment 103 may generate the complete usage curve 160 by fitting an approximating curve to the truncated usage distribution portion 163 and, thereafter, extrapolating the distribution beyond a usage constraint to generate a complete usage curve 160. As such, the complete usage curve 160 may include a truncated usage distribution portion 163 that is based on usage history for a user account, where the usage history is obtained from the network service usage data 136. The complete usage curve 160 may further include a predicted usage portion 166 that is estimated based at least in part on the truncated usage distribution portion 163 and/or usage history observed from other user accounts.

In various embodiments, the approximating curve may be performed statistically, for instance, using a truncated Poisson distribution routine, a zero-truncated Poisson distribution routine, a truncated Gaussian routine, a mixture of truncated Gaussian routines, a mixture of truncated Poisson routines, a cubic spline routine, or any combination thereof, or other approximation technique. In place of or in addition to the foregoing, the approximating curve may be determined using a curve-fitting routine traditionally used in computer graphics, such as a Bezier curve-fitting routine.

In 521, the computing environment 103 may perform one or more actions based on the complete usage curve generated in 518 or data associated therewith. For instance, an action may include sending the complete usage curve 160 to an administrator of the user account. An administrator of the user account may be able to manually adjust a usage constraint associated with the user account, for instance, by purchasing a higher or lower usage constraint.

Alternatively, in some embodiments, the computing environment 103 may take an automated action, such as automatically adjusting the usage constraint associated with the user account and charging the user account based on the adjustment.

In further embodiments, an operator of a data center may allocate more computing resources, such as more servers, networking equipment, or other equipment that can scale up computing resources in a data center or like facility. For instance, if an increase is usage exceeds a predetermined threshold (e.g., a five percent increase), an administrator or operator of a data center can be notified to increase a computing pool, add computing resources to a network service 109, or other suitable action as may be appreciated.

For instance in some embodiments, if a predicted usage portion 166 shows an increase in usage, the computing environment 103 may determine a risk to operation of a network service 109 based on the increase in usage. Additionally, in some embodiments, the computing environment 103 may determine the risk to a network service 109 as an aggregate of increases of usage by multiple user accounts. The risk may be generated as a quantifiable metric, such as a decimal value. Accordingly, in some embodiments, the computing environment 103 may increase a resource pool (e.g., a physical and/or virtual collection of computing and/or network resources) while minimizing risk to network service 109. Thereafter, the process may proceed to completion.

Figure 6:
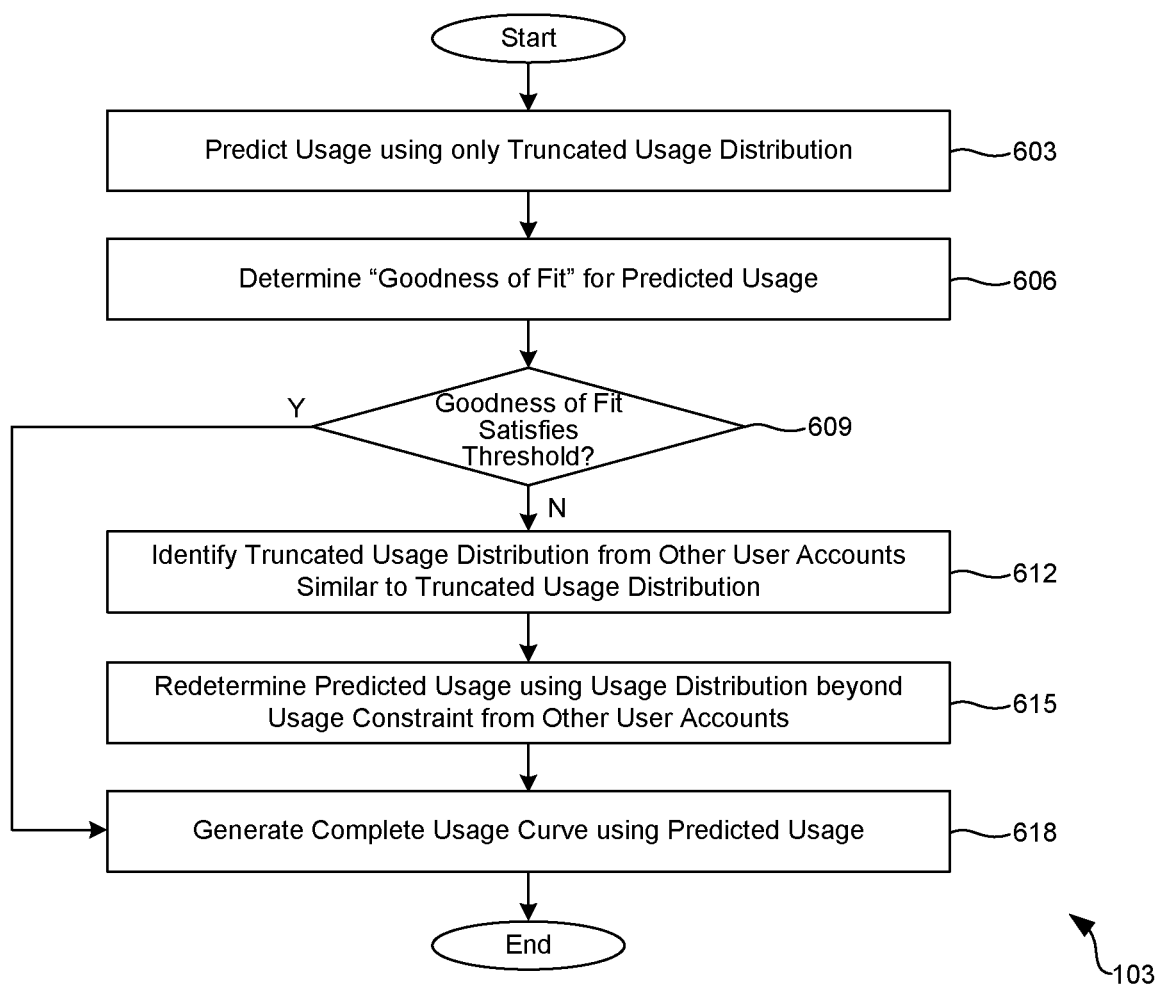

Turning now to FIG. 6, another flowchart is shown that provides one example of the operation of a portion of the demand prediction service 150 according to various embodiments. It is understood that the flowchart of FIG. 6 provides merely an example of the many different types of functional arrangements that may be employed to implement the operation of the portion of the demand prediction service 150 as described herein. As an alternative, the flowchart of FIG. 6 may be viewed as depicting an example of elements of a method implemented in the computing environment 103 according to one or more embodiments.

In some situations, extrapolation based on an observed truncated usage distribution may not be accurate. For example, a trailing end of a truncated usage distribution may be used to determine whether a usage trend is increasing, decreasing, or plateauing. As such, in some situations, when a reliability of a predicted usage does not satisfy a reliability threshold, other user accounts may be analyzed to predict usage.

According, in 603, the computing environment 103 may predict demand (or generate the predicted usage portion 166) using only the truncated usage distribution generated in 512.

In 606, the computing environment 103 may determine a reliability metric for the predicted usage, where the reliability metric is representative of a certainty whether the predicted usage is reliable or accurate. The reliability metric may include an integer, decimal value, or percentile (e.g., 1 to 10, 95%, and so forth) indicating a reliability of the predicted usage.

In 609, the computing environment 103 may determine whether the reliability metric generated in 606 satisfies a reliability threshold. For instance, assuming the reliability metric were a percentage (e.g., 80%), the computing environment 103 may determine whether the reliability metric is equal to or exceeds a reliability threshold of 90% or other value representative of a reliable predicted usage. If the reliability metric satisfies the reliability threshold, the process may proceed to 618 to generate the complete usage curve 160 using the predicted usage. Thereafter, the process may proceed to completion.

Referring back to 609, if the reliability metric does not satisfy the reliability threshold, the process may proceed to 612. In 612, the computing environment 103 may identify a truncated usage distribution of other user accounts that is similar to a truncated usage distribution of a particular user account. In other words, the demand prediction service 150 may identify user accounts having a usage similar to the truncated usage distribution portion 163 for a first account (e.g., Account X) and predict usage based on an analysis of those user accounts (e.g., Account A, Account B, Account C, and so forth). Accordingly, in 612, the computing environment 103 may compare the truncated usage distribution portion 163 for Account X to other usage distributions for other user accounts.

Thereafter, in 615, the computing environment 103 may determine (or redetermined) a predicted usage for the user account (e.g., Account X) using a usage distribution beyond a usage constraint identified from one or more other user accounts (e.g., Account A, Account B, Account C, and so forth). If the usage distributions for Account A, Account B, and Account C show decreases in usage over time, similarly, the predicted usage portion 166 may be generated to show a decrease in usage. Conversely, if the usage distributions for Account A, Account B, and Account C show increases in usage over time, the predicted usage portion 166 may be generated to show an increase in usage.

In some embodiments, the predicted usage portion 166 is generated based on an averaging of the usage occurring beyond a usage limit or other constraint. For instance, usage for three user accounts (e.g., Account A, Account B, and Account C) may be averaged to generate the predicted usage.

Accordingly, the predicted usage portion 166 of the complete usage curve 160 may be generated by identifying a first portion of a usage distribution for other ones of the user accounts that is similar to the truncated usage distribution portion 163 generated for a user account (e.g., Account X). Thereafter, the demand prediction service 150 may determine the predicted usage portion 166 for Account X based on a second portion of the usage distribution for Account A, Account B, Account C, and so forth.

Finally, in 618, the computing environment 103 may generate the complete usage curve 160 using the predicted usage determined in 603 and/or 618. Thereafter, the process may proceed to completion.

Figure 7:
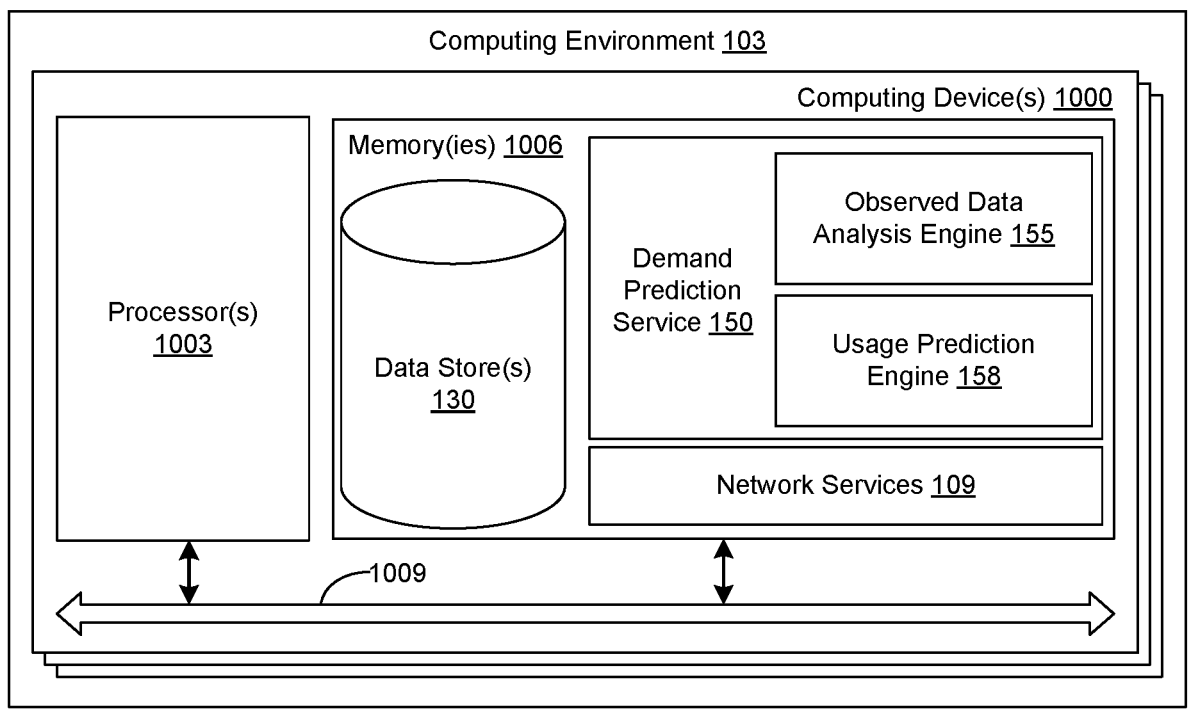
FIG. 7 is a schematic block diagram illustrating a computing environment employed in the networked environment of FIG. 1 according to various embodiments of the present disclosure.

With reference to FIG. 7, shown is a schematic block diagram of the computing environment 103 according to an embodiment of the present disclosure. The computing environment 103 includes one or more computing devices 1000. Each computing device 1000 includes at least one processor circuit, for example, having a processor 1003 and a memory 1006, both of which are coupled to a local interface 1009. To this end, each computing device 1000 may comprise, for example, at least one server computer or like device. The local interface 1009 may comprise, for example, a data bus with an accompanying address/control bus or other bus structure as may be appreciated.

Stored in the memory 1006 are both data and several components that are executable by the processor 1003. In particular, stored in the memory 1006 and executable by the processor 1003 are the demand prediction service 150, the observed data analysis engine 155, the usage prediction engine 158, the network services 109, and potentially other applications. Also stored in the memory 1006 may be the data store 130 and other data. In addition, an operating system may be stored in the memory 1006 and executable by the processor 1003.

It is understood that there may be other applications that are stored in the memory 1006 and are executable by the processor 1003 as may be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1006 and are executable by the processor 1003. In this respect, the term "executable" means a program file that is in a form that may ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 903 and/or multiple processor cores and the memory 1006 may represent multiple memories 906 that operate in parallel processing circuits, respectively. In such a case, the local interface 1009 may be an appropriate network that facilitates communication between any two of the multiple processors 903, between any processor 1003 and any of the memories 906, or between any two of the memories 906, etc. The local interface 1009 may comprise additional systems designed to coordinate this communication, including, for example, performing load balancing. The processor 1003 may be of electrical or of some other available construction.

Although the demand prediction service 150, the observed data analysis engine 155, the usage prediction engine 158, the network services 109, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5 and 6 show the functionality and operation of an implementation of portions of the demand prediction service 150, the observed data analysis engine 155, and the usage prediction engine 158. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the demand prediction service 150, the observed data analysis engine 155, the usage prediction engine 158, and the network services 109, that comprise software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the demand prediction service 150, the observed data analysis engine 155, the usage prediction engine 158, and the network services 109, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1000, or in multiple computing devices in the same computing environment 103.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore the following is claimed:

1. A system, comprising:
   at least one computing device; and
   at least one memory device to store program instructions executable in the at least one computing device that, when executed, direct the at least one computing device to:
   provide at least one network service for one of a plurality of user accounts, wherein a usage constraint is imposed on the user accounts for the at least one network service;
   generate a truncated usage distribution of the at least one network service based on usage history data corresponding to the one of the user accounts;
   identify use of the network service by other ones of the user accounts that is similar to the truncated usage distribution generated for the one of the user accounts;
   generate a predicted usage portion for a complete usage curve based at least in part on use of the network service by other ones of the user accounts beyond the usage constraint;
   generate the complete usage curve of the at least one network service for the user account, wherein the complete usage curve comprises the truncated usage distribution and the predicted usage portion; and
   perform at least one action comprising an adjustment to the usage constraint implemented by increasing, in association with the user account and based at least in part on the complete usage curve, a permitted number of requests to the at least one network service, a permitted number of messages sent by the at least one network service, or a permitted number of compute instances launched by the at least one network service, the at least one action further comprising dynamically reconfiguring the at least one computing device to adjust to variable load associated with the at least one network service.

2. The system of claim 1, wherein the predicted usage is determined based at least in part on an average of use of the network service by other ones of the user accounts beyond the usage constraint.

3. The system of claim 2, wherein the average of use is a weighted average of use that utilizes weights for individual ones of the user accounts, wherein the weights for individual ones of the user accounts are determined as a function of a similarity between truncated demand portions generated for two of the user accounts.

4. A system, comprising:
   at least one computing device; and at least one memory device to store program instructions executable in the at least one computing device that, when executed by the at least one computing device, direct the at least one computing device to:
- provide at least one network service for a user account, wherein a usage constraint is imposed on the user account for the at least one network service;
- generate a truncated usage distribution of the at least one network service based on usage history data;
- generate a demand curve of the at least one network service for the user account, wherein the demand curve comprises at least a portion of the truncated usage distribution and a predicted usage for the at least one network service beyond the usage constraint, wherein the predicted usage is generated by extrapolation of the truncated usage distribution beyond the usage constraint using an approximating curve fitted to the truncated usage distribution; and
- perform at least one action comprising an adjustment to the usage constraint implemented by updating, in association with the user account and based at least in part on the demand curve, a permitted number of requests to the at least one network service, a permitted number of messages sent by the at least one network service, or a permitted number of compute instances launched by the at least one network service, the at least one action further comprising dynamically reconfiguring the at least one computing device to adjust to variable load associated with the at least one network service.

5. The system of claim 4, wherein the adjustment to the usage constraint comprises increasing or decreasing the usage constraint.

6. The system of claim 5, wherein the approximating curve is generated based at least in part on a linear regression estimated routine, a truncated Poisson distribution routine, a zero-truncated Poisson (ZTP) distribution routine, a truncated Gaussian routine, a mixture of truncated Gaussian routines, a mixture of truncated Poisson routines, a cubic spline routine, or any combination thereof.

7. The system of claim 4, wherein the at least one action comprises sending the demand curve to an administrator of the user account.

8. The system of claim 4, wherein the at least one computing device is further directed to determine that the predicted usage shows an increase of usage of the at least one network service.

9. The system of claim 8, wherein the at least one computing device is further directed to determine a risk of operation of the at least one network service based at least in part on the increase of usage of the at least one network service.

10. The system of claim 9, wherein the at least one computing device is further directed to increase a resource pool of computing resources for the at least one network service that minimizes the risk of operation of the at least one network service.

11. The system of claim 4, wherein the at least one network service is selected from a group consisting of: a virtualized computing service, a data storage service, a machine learning service, a credential management service, a notification service, a blockchain service, and a serverless computing service.

12. The system of claim 4, wherein the usage constraint comprises a maximum number of programmatic calls to the at least one network service permitted in a given period of time or a maximum number of virtual or elastic computing instances invoked by the at least one network service permitted in a given period of time.

13. The system of claim 4, wherein the truncated usage distribution of the at least one network service is generated based on usage history data by:
- accessing a plurality of records of the usage history data;
- determining that an amount of the plurality of records exceeds a predefined threshold; and
- in response to the amount of the plurality of records exceeding a predefined threshold, computing a plurality of quantiles for use in place of the plurality of records, wherein the truncated usage distribution of the at least one network service is generated using the plurality of quantiles.

14. A computer-implemented method, comprising:
- providing, by at least one computing device, a network service for a user account, the network service being configured to receive programmatic network calls over a network to store, retrieve, or process data;
- imposing, by the at least one computing device, a usage constraint for the network service on the user account;
- generating, by the at least one computing device, a truncated usage distribution of the network service based on usage history data stored in association with the user account;
- generating, by the at least one computing device, a predicted usage of the network service for the user account based at least in part on a subset of use of the network service by other user accounts beyond the usage constraint, wherein the use of the network service by the other user accounts is identified as similar to the truncated usage distribution for the user account;
- generating, by the at least one computing device, a complete usage curve of the network service for the user account, the complete usage curve comprising the truncated usage distribution and a portion corresponding to the predicted usage; and
- performing, by the at least one computing device, an action that adjusts the usage constraint in association with the user account based at least in part on the complete usage curve or data associated therewith, the action further comprising dynamically reconfiguring the at least one computing device to adjust to variable load associated with the at least one network service.

15. The method of claim 14, wherein the usage constraint is updated by increasing or decreasing the usage constraint.

16. The method of claim 14, wherein the predicted usage is determined based at least in part on an average of use of the network service by the other user accounts beyond the usage constraint.

17. The method of claim 16, wherein the average of use is a weighted average of use that utilizes weights for individual ones of the user accounts.

18. The method of claim 17, wherein the weights for the individual ones of the user accounts are determined as a function of a similarity between truncated demand portions generated for two of the user accounts.

19. The method of claim 14, further comprising sending the complete usage curve to an administrator of the user account.

20. The method of claim 14, wherein the truncated usage distribution of the network service is generated based on usage history data by:
- accessing a plurality of records of the usage history data;
- determining that an amount of the plurality of records exceeds a predefined threshold; and
- in response to the amount of the plurality of records exceeding a predefined threshold, computing a plurality of quantiles for use in place of the plurality of records, wherein the truncated usage distribution of the at least one network service is generated using the plurality of quantiles.

* * * * *